(12) United States Patent
Smelker

(10) Patent No.: US 6,207,943 B1
(45) Date of Patent: Mar. 27, 2001

(54) CONSISTENT BRIGHTNESS BACKLIGHT SYSTEM

(75) Inventor: Thomas C. Smelker, Venice, FL (US)

(73) Assignee: Baker Electronics, Inc., Sarasota, FL (US)

( * ) Notice: Subject to any disclaimer, the term of this patent is extended or adjusted under 35 U.S.C. 154(b) by 0 days.

(21) Appl. No.: 09/182,217

(22) Filed: Oct. 30, 1998

Related U.S. Application Data

(60) Provisional application No. 60/063,573, filed on Oct. 30, 1997.

(51) Int. Cl.[7] .............................. G01J 1/32; H05B 37/02
(52) U.S. Cl. ............................. 250/205; 315/86
(58) Field of Search ............... 250/205; 315/86, 315/156–159, 169.3, 224, 307; 320/106, 135, 136; 345/63, 102, 204; 349/61

(56) References Cited

U.S. PATENT DOCUMENTS

| | | |
|---|---|---|
| 5,122,791 | 6/1992 | Gibbons et al. . |
| 5,128,781 | 7/1992 | Ohno et al. . |
| 5,272,327 * | 12/1993 | Mitchell ................................ 250/205 |
| 5,619,402 | 4/1997 | Liu . |
| 5,818,172 * | 10/1998 | Lee ......................................... 315/86 |
| 6,028,398 * | 2/2000 | Kawasaki et al. ................... 315/224 |

* cited by examiner

Primary Examiner—Stephone B. Allen
(74) Attorney, Agent, or Firm—McDermott, Will & Emery

(57) ABSTRACT

In order to extend the life of a light source such as a CCFL or the like being used in backlighting system for an LCD, the present invention includes an optical sensing circuit, an amplification circuit, an averaging circuit, a comparator circuit, a controller, and an inverter dimmer circuit. The initial power applied to the light source is limited to a value which is less than its maximum rate power thus reducing the rate of light source degradation geometrically. The brightness of the light source is monitored using a photosensitive element/sensor, and as the brightness reduces with the passing of time, the power that is supplied to the light source is gradually increased. This both prolongs the life of the life source and obviates any perceivable reduction in display brightness.

28 Claims, 2 Drawing Sheets

CONSISTENT BRIGHTNESS BACKLIGHT SYSTEM

This application claims priority from Provisional Application Ser. No. 60/063,573, filed Oct. 30, 1997 and entitled "Consistent Brightness Backlight System.

BACKGROUND OF THE INVENTION

1. Field of the Invention

The present invention relates to a backlighting system for a LCD type display. More specifically, the present invention relates to a backlighting system which monitors the brightness of the backlight illumination and which gradually increases the power supplied to the backlight in order to compensate for the degradation of the light source lamp with the passing of time.

2. Description of the Related Art

Display technology is rapidly changing with the advent of better and brighter liquid crystal displays (LCDs). As is known, cathode ray tubes (CRTs) are being rapidly replaced by LCDs due to the size and power advantages that are possible with such arrangements.

A few short years ago, the brightness of LCDs was 2.5 times less than that possible with CRTs. However, advances in backlighting technology have enabled the development of LCD displays that now exhibit brightness that rivals that possible with CRTs. These advances have involved the use of brightness enhancing films which focus the viewable light being emitted from the screen, color polarizers which maximize the usable light coming from the backlight, and more efficient light guides.

However, one undesirable tendency in this quest for brighter displays, is to either drive the light sources at their fill rated power, or even to overdrive the same from the outset. This of course, increases the brightness that is produced, but markedly speeds up the rate of degradation of the light sources and drastically reduces the life of the lamp or lamps being used.

Accordingly, one advantage that CRT-type displays have over LCDs is that the CRT type display exhibits more consistent display brightness over its lifetime. More specifically, a CRT will decrease in brightness about 10% 15% during its lifetime due to factors relating to the electronic gun filament, phosphor degradation and the driving electronics. Depending on the type of CRT, one or all of these factors may be responsible for the reduction in brightness with the passing of time. An LCD, on the other hand, will decrease in brightness by about 50%. This reduction is, however, is directly related to the degradation of the backlighting system associated with the liquid crystal structures which actually produce the image(s).

In most instances, the backlighting for LCD type displays is provided by one or more cold cathode fluorescent lamps (CCFLs), a power inverter and a light guide. The CCFL is the only component that degrades significantly with the passing of time. Accordingly, as the user must manually adjust the level of brightness to that which is preferred, it quickly becomes apparent to the user that the rate of reduction in the brightness in LCD type displays is more pronounced than with those which are based on CRT.

Additionally, the change in brightness in a LCD equipped display, which follows a service wherein the light source(s) is replaced, tends to be much more apparent to the user than in the case wherein a new CRT is installed.

Hence, in order to make LCD displays acceptable alternatives to CRTs, it is necessary to reduce the degree by which the brightness of LCDs are perceived to vary and reduce the passing of time.

SUMMARY OF THE INVENTION

It is an object of the present invention to provide a backlighting arrangement for an LCD or the like type of display which enables the level with which the brightness of the display can be maintained for protracted periods of time and thus rival the stability which has been responsible for the widespread use of CRT's.

It is a further object of the present invention to provide a backlighting arrangement for an LCD or the like type of display, which increases the working life of the light sources which are used therein while automatically maintaining the level of illumination essentially constant.

As is well known, driving CCFL of backlighting system at or above 100% of their rated power is such as to induce relatively rapid degradation which shortens the mean time before failure, or MTBF (i.e., the operational hours required for a display's brightness to drop by half). The present invention therefore is such to drive the light sources at less than 100% of their rated power specification. This not only facilitates the control that the invention seeks to provide, but also prolongs MTBF markedly. That is to say, the relationship of power to life is not linear but rather is geometric. A 50% reduction in the power used to drive a light sources can result in a five fold increase in the MTBF. Therefore, a CCFL with a rated MTBF of 20,000 Hrs. will be increased to about 100,000 Hrs. with a 50% reduction in driving power.

The present invention features the use of a photocell type sensor to measure the brightness of the CCFL. This cell is used to monitor the reduction in brightness produced by the light source and to accordingly increase the amount of power that is supplied thereto. This increase in power is selected to result in the brightness being maintained at its original level.

This technique also demands that the original power setting be less than 100% of the rated power so that the amount of power can be increased with the passing of time. This initial low power setting, of course, tends to increase the life of the light sources so that with the gradual increase in the amount of power, which is induced in accordance with the present invention, an MTBF on the order of 10,000 hours is considered readily attainable.

In more specific terms, a first aspect of the present invention resides in a device for use with a LCD comprising: a light source for providing a backlight for the LCD; means for measuring a level of brightness of the light source; means for comparing the level of brightness to a reference level of brightness; and means for increasing the power to the light source when the level of brightness falls below the reference level of brightness and for maintaining a constant level of brightness for the LCD.

In the above-mentioned device, the light source comprises at least one cold cathode fluorescent lamp and the means for measuring brightness comprises a photocell.

In addition, the means for comparing the level of brightness comprises at least one comparator circuit and the means for increasing the power to the light source comprises at least one potentiometer.

A second aspect of the invention resides in a method of maintaining a constant level of brightness for a LCD comprising the steps of: measuring a brightness level of a light source using a photocell; comparing the brightness level of the light source to a reference level of brightness; increasing the power of the light source when the brightness level falls below the reference level to maintain a constant level of brightness for the LCD.

In the above mentioned method, it is possible to drive the light source at less than 100% of its rated power so as to increase the life of the light source. For example, 75% rated power can be supplied to produce a brightness level of 150 Nits.

A further aspect of the invention resides in a backlight device for an LCD comprising: a light guide located behind the LCD; at least one light source located behind the light guide; means for measuring a brightness level of the light source, the measuring means being disposed proximate to the light source; means for comparing the brightness level with a reference level of brightness, the comparing means being electrically connected to the measuring means; means for increasing the power to the light source when the brightness level of the light source falls below the reference level of brightness and for maintaining a constant brightness level, the power increasing means being electrically connected to each of the comparing means and the light source.

Yet another aspect of the invention resides in a method of controlling the brightness of a display comprising the steps of: illuminating a light source by supplying the light source with electrical power; monitoring illumination brightness and producing a signal indicative of the amount of brightness produced by the light source; and controlling the amount of electrical power supplied to the light source to maintain the brightness of illumination which is produced by the light source, constant and at a level which is selected to be that which is produced by a new light source when driven at a predetermined amount below 100% of its rated power.

BRIEF DESCRIPTION OF THE DRAWINGS

The various features and advantages of the present invention will become more clearly appreciated as a detailed description of the preferred embodiment is given with reference to the appended drawings wherein.

DETAILED DESCRIPTION OF THE PREFERRED EMBODIMENTS

Figure 1:
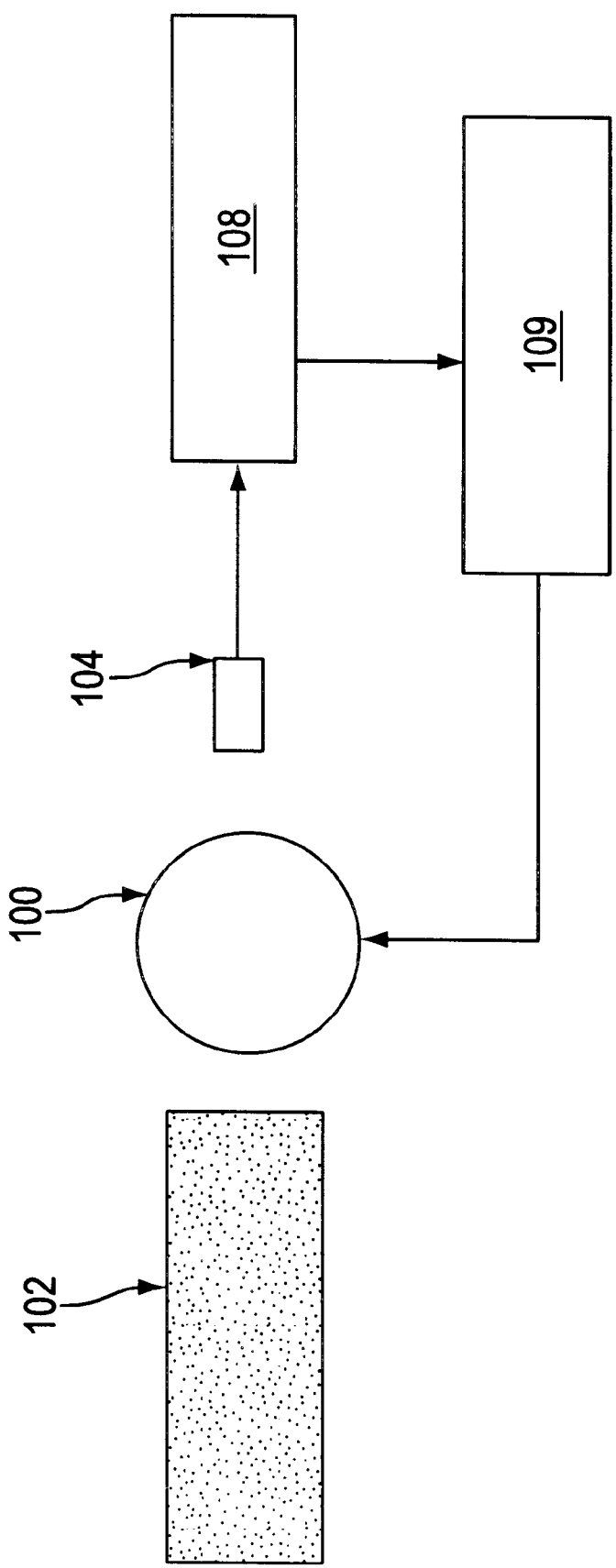
FIG. 1 is a schematic diagram showing a light source arranged with a light guide and a photocell in accordance with the concept of the present invention.

FIG. 1 schematically illustrates an embodiment of the present invention. In this particular instance a light source 100 is disposed in an operative position with respect to a light guide 102 in a manner well known in the art of backlighting. A photo responsive sensor 104 or the like is disposed in a position to be exposed to the light generated by the light source 100. Although not shown in this figure, the sensor 104 can be disposed behind a reflector and exposed to the light from the light source by way of a small aperture that is formed in the curved plate which constitutes the reflector. In the preferred embodiment of the present invention, a sensor array having a number of sensors 104 are used to measure the brightness levels of the light source at different locations, described in detail further herein. The sensors 104 are arranged to produce outputs or vary parameters in a manner which is indicative of the amount of light being received at the specific location and therefore indicative of the brightness level of that portion of the light source.

In this particular embodiment, the light source or lamp 100 is a CCFL. An example of a CCFL can be found in U.S. Pat. No. 5,619,402 issued on Apr. 8, 1997 in the name of K. H. Liu. The disclosure of this patent is hereby incorporated by reference.

As schematically shown, the sensor array 104 is arranged to apply its outputs to a controller 108, typically a microprocessor or equivalent, which is operatively connected with an inverter dimmer potentiometer 109 that provides the voltage to drive the lamp 100. The controller 108 increases the amount of power supplied to the lamp 100 in response to a decrease in the level of the signal from the sensor array 104, explained in detail below. As the manner in which this control can be carried out will be more than within the purview of those skilled in the art of power level control, no further description or examples of specific circuitry will be given for the sake of brevity. An example of a circuit which can be used to vary the supply of current to a lamp of the nature used in the present invention can be found in U.S. Pat. No. 5,272,327 issued to Mitchell et al. on Dec. 21, 1993. The content of this document is hereby incorporated by reference.

By way of example, with the present invention, it is possible to use a CCFL as the lamp which is capable of producing a brightness of 200 Nits when driven at 100% of its power rating, and to initially supply power which will drive the lamp at 75% of its power rating and produce a brightness of approximately 150 Nits. This initial reduced power setting, as clear from above, geometrically increases the MTBF of the CCFL. Of course, the reduced level of brightness need not be limited to 75%. Any reduced level may be chosen that increases the life of the light source while still providing the user with a sufficient level of brightness.

By gradually increasing the amount of power which is supplied to the CCFL under the control of the sensor array 104 and related circuitry, it is possible to maintain a brightness output of 150 Nits until the power level is increased to the maximum. Tests have indicated that it is theoretically possible to expect a MTBF of 22,500 hours using this particular type of technique.

In accordance with the present invention, it is also possible to combine the above basic technique with the above-mentioned brightness enhancing techniques such as brightness enhancing films which focus the viewable light being emitted from the screen, color polarizers which maximize the usable light coming from the backlight, and more efficient light guides. This has been shown, with an initial driving level 43.75% below 100% of the rated power, to produce a brightness of 200 Nits through the LCD screen. By setting the sensor to maintain this 200 Nit level of brightness, it has been estimated that, with the gradual increase in power up to the maximum, it would be possible to achieve a MTBF of 35,000 hours.

Figure 2:
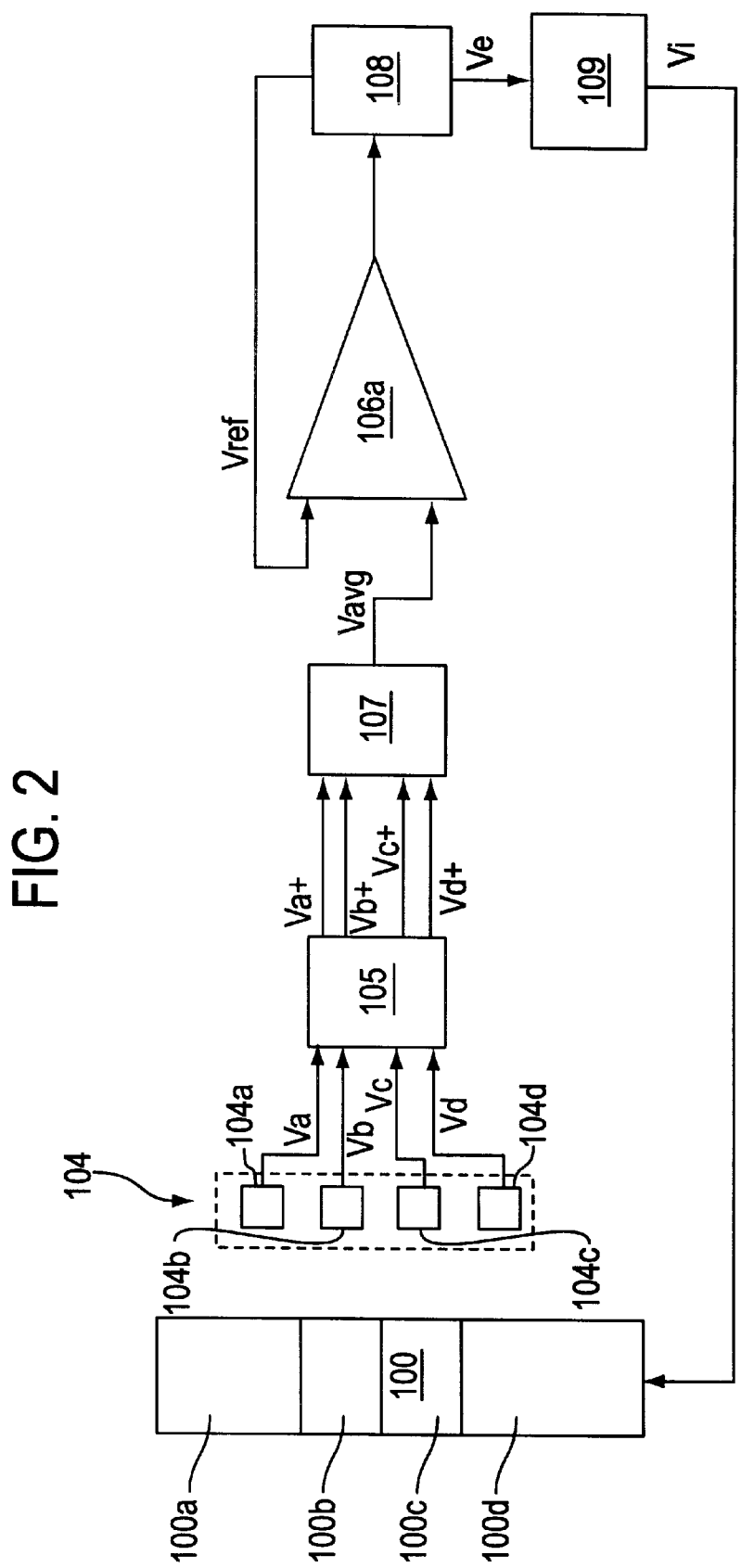
FIG. 2 is a schematic circuit diagram showing a circuit via which the level of current that is supplied to the lamp of the backlight arrangement can be controlled in accordance with the concept underlying the present invention.

Referring now to FIG. 2, a circuit arrangement that can be used in accordance with the present invention to control the level of brightness in response to the level of brightness produced by the lamp 100 is schematically shown. More specifically, a sensor array 104 includes photocells 104$a$–$d$ for measuring the brightness levels of each CCFL tube 100$a$–$d$ of lamp 100. Each photocell 104$a$–$d$ generates a signal $v_a$–$v_d$ that corresponds to the brightness level of a portion of the lamp 100. Each signal $v_a$–$v_d$ is routed to an amplifier circuit 105 that generates amplified signals $v_{a+}$–$v_{d+}$. The amplified signals $v_{a+}$–$v_{d+}$ are then fed into an averaging circuit 107 resulting in an averaged voltage signal $v_{avg}$. The averaged voltage signal $v_{avg}$ is then used as one input to a comparator circuit 106a. The other input is a reference voltage $v_{ref}$ that is supplied by the controller 108. The reference voltage $v_{ref}$ corresponds to the desired level of brightness of the lamp 100. The comparator circuit 106a compares the averaged voltage signal $v_{avg}$ with the reference voltage $v_{ref}$. If the averaged voltage signal $v_{avg}$ falls within an acceptable range of the reference voltage $v_{ref}$ then the brightness level of the lamp 100 is acceptable and no change is made. However, if the brightness level of the lamp 100 is not adequate, that is, if $v_{avg}$ falls outside an acceptable range, the controller 108 issues a control signal $v_e$ to the inverter circuit 109 that drives the lamp 100; the inverter circuit 109 then increases the voltage $v_l$ to the lamp 100 to increase the brightness to the desired level.

While the present invention has been described with reference to only a limited number of examples/embodiments, it is to be understood that the invention is limited only by the appended claims and that various modifications and changes can be made without departing from the spirit of the invention. For example, it is within the scope of the present invention to allow for the user to set the required level of brightness at a value which is less than the maximum which can be generated under the automatic feed-back control provided by the above-described circuit arrangements. The manner in which this can be implemented will be self-evident to those skilled in the art to which the present invention pertains. Merely as an example, the level of the reference which is supplied can be raised so that the comparator 106a will not produce an output; alternatively, the maximum amount of current which is permitted to flow to the lamp 100 simply be limited below that which would initially produce a brightness of 150 Nits by through the use of a manually controlled variable resistor (not shown). With this type of independent control, the effect of the feedback loop would be bypassed in a manner that allows the brightness to be lowered to an acceptable level. On the other hand, if the user wanted maximum brightness, the variable resistor could be turned up to permit the maximum current that is possible under the control of the controller 108 to be supplied to the lamp or lamps 104.

What is claimed is:

1. A device for use with a LCD comprising:
    a light source comprising a plurality of CCFL tubes;
    a plurality of photocells, each of said plurality of photocells corresponding to each of said plurality of CCFL tubes;
    an amplifying circuit electrically connected to said plurality of photocells;
    an averaging circuit electrically connected to said amplifying circuit;
    a comparator circuit electrically connected to said averaging circuit;
    a controller electrically connected to said comparator circuit; and,
    an inverter circuit electrically connected to both said controller and said light source;
    whereby said light source is maintained at a consistent level of brightness.

2. A device for use with a LCD comprising:
    a light source for providing a backlight for the LCD;
    means for measuring a level of brightness of said light source;
    means for comparing said level of brightness to a reference level of brightness; and
    means for increasing the power to said light source when said level of brightness falls below said reference level of brightness and for maintaining a constant level of brightness for the LCD.

3. The device as set forth in claim 2, wherein said light source comprises at least one cold cathode fluorescent lamp.

4. The device as set forth in claim 2, wherein said means for measuring brightness comprises a plurality of photocells.

5. The device as set forth in claim 4 further comprising an averaging circuit being connected to said plurality of photocells.

6. The device as set forth in claim 2, wherein said means for comparing said level of brightness comprises at least one comparator circuit.

7. The device according to claim 2, wherein said means for increasing the power to said light source comprises at least one potentiometer.

8. A method of maintaining a constant level of brightness for a LCD comprising the steps of:
    measuring a brightness level of a light source which illuminates the LCD, using a photocell;
    comparing the brightness level of the light source to a reference level of brightness; and,
    increasing the power of the light source when the brightness level falls below the reference level to maintain a constant level of brightness for the LCD.

9. The method as set forth in claim 8, further comprising the step of driving the light source at less than 100% of its rated power so as to increase a life of the light source.

10. The method as set forth in claim 8, further comprising the step of driving the light source at a range of about 70% to 80% of rated power to produce a brightness level of about 150 Nits.

11. A backlight device for an LCD comprising:
    a light guide located behind the LCD;
    at least one light source located adjacent said light guide;
    means for measuring a brightness level of said light source, said measuring means being disposed proximate to said light source;
    means for comparing the brightness level with a reference level of brightness, said comparing means being electrically connected to said measuring means; and,
    means for increasing power to said light source when the brightness level of said light source falls below the reference level of brightness and for maintaining a constant brightness level, said power increasing means being electrically connected to each of said comparing means and said light source.

12. The device as set forth in claim 11, wherein said means for measuring brightness level comprises a photocell.

13. The device as set forth in claim 11, wherein said means for comparing comprises a comparator circuit.

14. The device as set forth in claim 11, wherein said means for increasing the power to said light source comprises a potentiometer.

15. A method of maintaining a brightness level of an LCD comprising the steps of:
    setting a reference level of brightness for the LCD;
    measuring a brightness level of a light source for said LCD;
    comparing the brightness level of said light source with the reference level of brightness;
    providing a signal when the brightness level of said light source falls below the reference level of brightness; and
    increasing the power to said light source when the signal is received so as to maintain the level of brightness of the LCD constant.

16. The method set forth in claim 15, further comprising the step of driving said light source at less than 100% rated power while maintaining a minimum level of brightness.

17. The method set forth in claim 16, wherein the minimum level of brightness comprises about 150 Nits.

18. A method of controlling the brightness of a display comprising the steps of:
   illuminating a light source by supplying the light source with electrical power;
   monitoring illumination brightness and producing a signal indicative of the amount of brightness produce by the light source; and
   controlling the amount of electrical power supplied to the light source to maintain the brightness of illumination, which is produced by the light source, constant and at a level which is selected to be that which is produced by a new light source when driven at a predetermined amount below 100% of its rated power.

19. A method as set forth in claim 18, wherein the step of controlling includes the steps of increasing the amount of electrical power which is supplied to the light source as the light source degrades and is capable of producing less brightness for the amount of electrical power supplied thereto.

20. A method as set forth in claim 18, wherein the predetermined level to which the illumination is controlled within a range of about 70% to 80% of the rated power of the light source.

21. A method as set forth in claim 18, wherein the step of monitoring comprises using a light responsive element comprising a photocell which produces an electrical output in accordance with the amount of light which impinges thereon from the light source.

22. An apparatus for controlling the brightness of a display comprising:
   means for illuminating a light source by supplying the light source with electrical power;
   means for monitoring the amount of illumination and producing a signal indicative of the amount of illumination produce by the light source; and
   means for controlling the amount of electrical power supplied to the light source to maintain the brightness of illumination which is produced by the light source, constant and at a level which is selected to be that which is produced by a new light source when driven at a predetermined amount below 100% of its rated power.

23. A method for maintaining a brightness level of a light source, comprising the steps of:
   measuring a first brightness level of said light source;
   generating a first signal corresponding to said first brightness level;
   comparing said first signal with a reference signal corresponding to a desired level of brightness of said light source; and, increasing the voltage to said light source in response to the difference between said first signal and said reference signal.

24. The method according to claim 23 further comprising the steps of:
   measuring a second brightness level of said light source;
   generating a second signal corresponding to said second brightness level;
   averaging said first signal and said second signal to form an averaged signal value; and,
   increasing the voltage to said light source in response to the difference between said averaged signal and said reference signal.

25. The method according to claim 24 further comprising the step of amplifying said averaged signal.

26. The method according to claim 24 wherein said maintained brightness level comprises a range of about 70% to 80% of the maximum brightness of said light source.

27. A device for use with a light source, comprising:
   means for measuring a plurality of brightness levels of said light source;
   means for averaging said brightness levels of said light source, said averaging means being connected to said measuring means;
   means for comparing an average brightness level of said light source to a reference brightness level, said comparing means being connected to said averaging means;
   means for issuing a correction signal based on a difference between said average brightness level of said light source and said reference brightness level, said issuing means being connected to said comparing means; and,
   means for increasing a voltage to said light source in response to said correction signal; said increasing means being connected to said issuing means and said light source;
   whereby maintaining said brightness level of said light source at a constant level.

28. The device according to claim 27 wherein said maintained brightness level comprises a range of about 70% to 80% of the maximum brightness of said light source.

* * * * *